(12) United States Patent
Beauprez

(10) Patent No.: US 6,702,470 B2
(45) Date of Patent: Mar. 9, 2004

(54) ROLLER BEARING PROVIDED WITH A SENSOR ASSEMBLY CASING

(75) Inventor: Jean-Michel Beauprez, Menthonnex sous Clermont (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 10/115,227

(22) Filed: Apr. 3, 2002

(65) Prior Publication Data

US 2002/0181813 A1 Dec. 5, 2002

(30) Foreign Application Priority Data

Apr. 6, 2001 (FR) .............................. 01-04735

(51) Int. Cl.⁷ .............................. F16L 33/30; G01D 3/48
(52) U.S. Cl. .................................. 384/448; 324/207.25
(58) Field of Search .......................... 384/448; 324/173, 324/174, 207.25

(56) References Cited

U.S. PATENT DOCUMENTS 4,988,219 A    1/1991   Peilloud
5,873,658 A  * 2/1999   Message et al. ............ 384/448
6,352,370 B1 * 3/2002   Nicot .......................... 384/448

FOREIGN PATENT DOCUMENTS

| GB | 1 509 170     |   | 4/1978  |
|----|---------------|---|---------|
| GB | 2207470 A     | * | 2/1989  |
| WO | WO-00/62079   | * | 10/2000 |

* cited by examiner

Primary Examiner—Thomas R. Hannon
(74) Attorney, Agent, or Firm—Michael Best & Friedrich LLP

(57) ABSTRACT

Roller bearing (1) equipped with an information sensor device, containing a rotating internal ring (3), a fixed external ring (2) and roller bodies (4) arranged between them, in which said information sensor device contains an encoder (10) and a sensor (11), said roller bearing (1) containing an assembly casing (22) of sensor (11) with the fixed ring (2), said casing (22) containing a cylindrical support (23) that extends over the entire axial length of the external transversal faces of sensor (11) and external ring (2), and means of axial holding (26, 27) arranged on both sides of said support (23), said means (26, 27) being supported on at least one part of the front and rear lateral faces (28, 29) of sensor (11) and external ring (2).

8 Claims, 5 Drawing Sheets

ROLLER BEARING PROVIDED WITH A SENSOR ASSEMBLY CASING

BACKGROUND

The invention concerns a roller bearing equipped with an information sensor device.

Such roller bearings, when equipped with a rotational speed sensor device, an angular position sensor and/or a sensor of the direction of rotation of the rotating ring relative to the fixed ring, can be used, in particular, in the steering columns of an automobile. In particular, the information can be converted to function signals of the torque exerted on the intermediate column of the steering wheel, said signals being used by a computer-assisted steering system.

In another example of application, such roller bearings are used for the wheels of automobiles provided with an anti-locking system of said wheels, and the information is then used by a computer-assisted braking system.

Roller bearings equipped with an information sensor device containing a magnetic pulse generator-encoder connected to the rotating ring and a sensor equipped with at least two sensitive elements capable of detecting these pulses connected to the fixed ring are already known.

One of the problems posed with such roller bearings is connection of the sensor to the roller bearing.

In effect, the sensor must be integrated with the roller bearing in precise fashion, so that the sensitive elements face each other and are at a distance from the air gap of the encoder.

Moreover, and especially for safety uses, like anti-locking of wheels or steering assistance, this integration must be sufficiently reliable, so as not to risk inadvertent disassembly of the sensor.

To solve this problem, it is known that the sensor can be clipped or mounted on a transversal face of the exterior ring.

But this solution presents the drawback of being specific to each roller bearing dimension in requiring either a special sensor for each dimension of the roller bearing or roller bearings provided with specific means of connection for a given type of sensor.

For reasons of standardization of roller bearings and sensors, this solution is therefore not optimal, especially for applications in the automotive industry.

SUMMARY

The invention provides a roller bearing in which a sensor can be connected precisely and reliably to roller bearings of different size by means of a device that does not require specific modification of said roller bearing.

The invention provides a roller bearing equipped with an information sensor device, comprising a rotating internal ring, a fixed external ring and roller bodies arranged between them, in which said information sensor device contains a magnetic pulse generator-encoder connected to the rotating ring and a sensor equipped with at least two sensitive elements capable of detecting these pulses connected to the fixed ring, said roller bearing containing an assembly casing of the sensor with the fixed ring, said casing containing a cylindrical support that extends over the entire axial length of the external transversal faces of the sensor and external ring, and means of axial holding arranged on both sides of said support, said means being supported on at least one part of the front and rear lateral faces of the sensor and external ring, respectively.

BRIEF DESCRIPTION OF THE DRAWINGS

Other objects and advantages of the invention will be apparent in the following description, with reference to the appended drawings, in which.

DETAILED DESCRIPTION OF THE PREFERRED EMBODIMENTS

Figure 1:
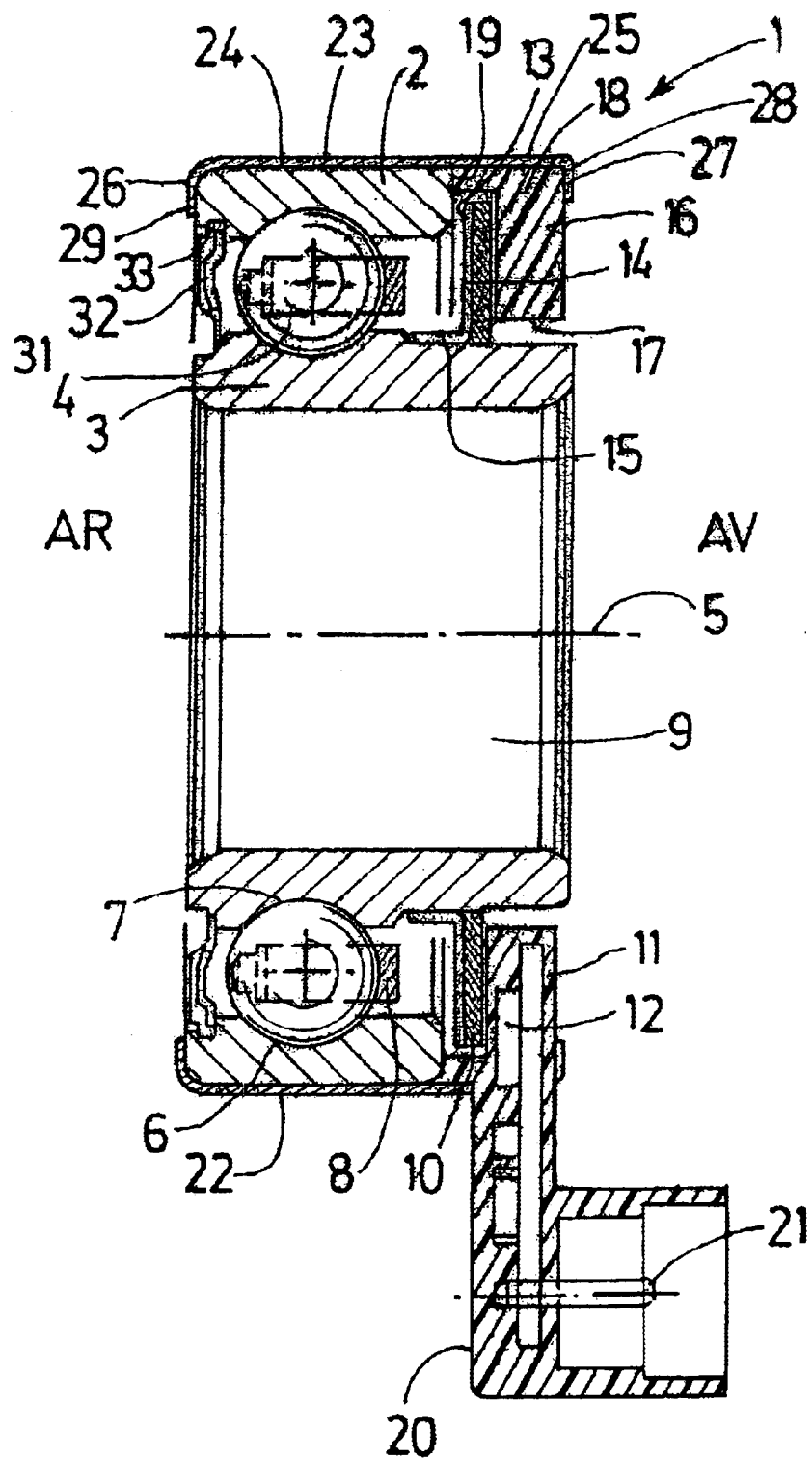
FIG. 1 shows, in a longitudinal section, a first variant of a roller bearing according to the invention.

A roller bearing 1, ready for use, is shown in FIGS. 1 to 5, containing an external fixed ring 2, an internal rotating ring 3 and roller bodies 4 arranged between them to permit relative rotation of these two rings 2, 3 around an axis 5.

The terms "external" and "internal" in the description are defined relative to an opposite and facing plane of axis 5, the terms "axial" or "transversal" being defined relative to a plane parallel to axis 5, the terms "radial" or "lateral" being defined relative to a plane perpendicular to axis 5, the terms "front" and "rear" being defined relative to the indices av and ar shown in the figures, the dimensions measured along axis 5 or perpendicular to it being referred to, respectively, as "axial" and "radial".

In the depicted variants, a ball race 6, 7 is made on the internal face of fixed ring 2 and on the external face of rotating ring 3 and rolling is ensured by a series of balls 4 kept equidistant by cages 8.

Such roller bearings 1 are used, for example, to ensure rotation of a steering column or rotation of the wheels of an automobile. For this purpose, the internal ring 3 has a bore 9 intended to house the steering column or hub of the wheel.

When one wishes to know the rotational speed, the direction of displacement and/or the angular position of the rotating ring 3 relative to fixed ring 2, it is known to use an information sensor device containing an encoder 10 of a magnetic pulse generator connected to the rotating ring 3 and a sensor 11 equipped with at least two sensitive elements 12 capable of detecting these pulses connected to fixed ring 2.

This type of information, after electronic treatment, such as that described in document FR-2 792 380, is conventionally used in driving assistance systems, like steering assistance or wheel anti-locking systems.

In a particular example, the encoder 10 is formed from a multipole ring made of synthetic material filled with ferrite particles formed from a number of domains adjacent to the inverted direction of magnetization of a given domain relative to the two adjacent domains.

In the depicted variants, the encoder 10 is molded onto a cylindrical annular and radial support 13 of a reinforcement 14. The reinforcement 14 also contains an annular and axial cylindrical support 15 connected, for example, by mounting, on the external face of the internal ring 3. This variant permits joint rotation of encoder 10 and internal ring 3.

In one particular example, the sensor 11 contains at least two sensitive elements 12, for example, a number of aligned sensitive elements 12 chosen among Hall-effect sensors, magnetoresistors, giant magnetoresistors. In known fashion, such elements 12 are capable of detecting the magnetic pulses generated by encoder 10, in order to supply signals that represent rotational speed, direction of displacement and/or angular position of the rotating ring 3 relative to fixed ring 2.

In the variants depicted in the figures, the sensor 11 is formed from a ring 16 concentric to roller bearing 1, and a bore 17 is formed in ring 16 so that it does not interfere with rotation of rotating ring 3.

Ring 16 contains a peripheral extension 18 that extends axially to the rear, and whose length is designed, by being supported on the lateral front face 19 of fixed ring 2, to permit positioning of the sensitive elements 12 facing each other and at a distance from the air gap of encoder 10.

For this purpose, the lateral front face 19 of fixed ring 2 does not contain specific machining to permit holding or positioning of sensor 11 with the sensitive elements 12 at a distance from the air gap of encoder 10.

Also, the sensor 11 contains a radial housing 20 designed to receive the input/output connector 21 of sensor 11, for example, formed from a multiwire connector or cable.

In a particular example, the sensor 11 is made in monoblock fashion, for example, by molding of a plastic material, with the sensitive elements 12 arranged within ring 16.

Connection of sensor 11 to the external ring 2 is accomplished by means of an assembly casing 22. For example, casing 22 is made from a metal material by bulk machining or from a tube.

Casing 22 contains a cylindrical support 23 that extends over the entire axial length of the transversal external faces of fixed ring 2 and sensor 11.

Figure 2:
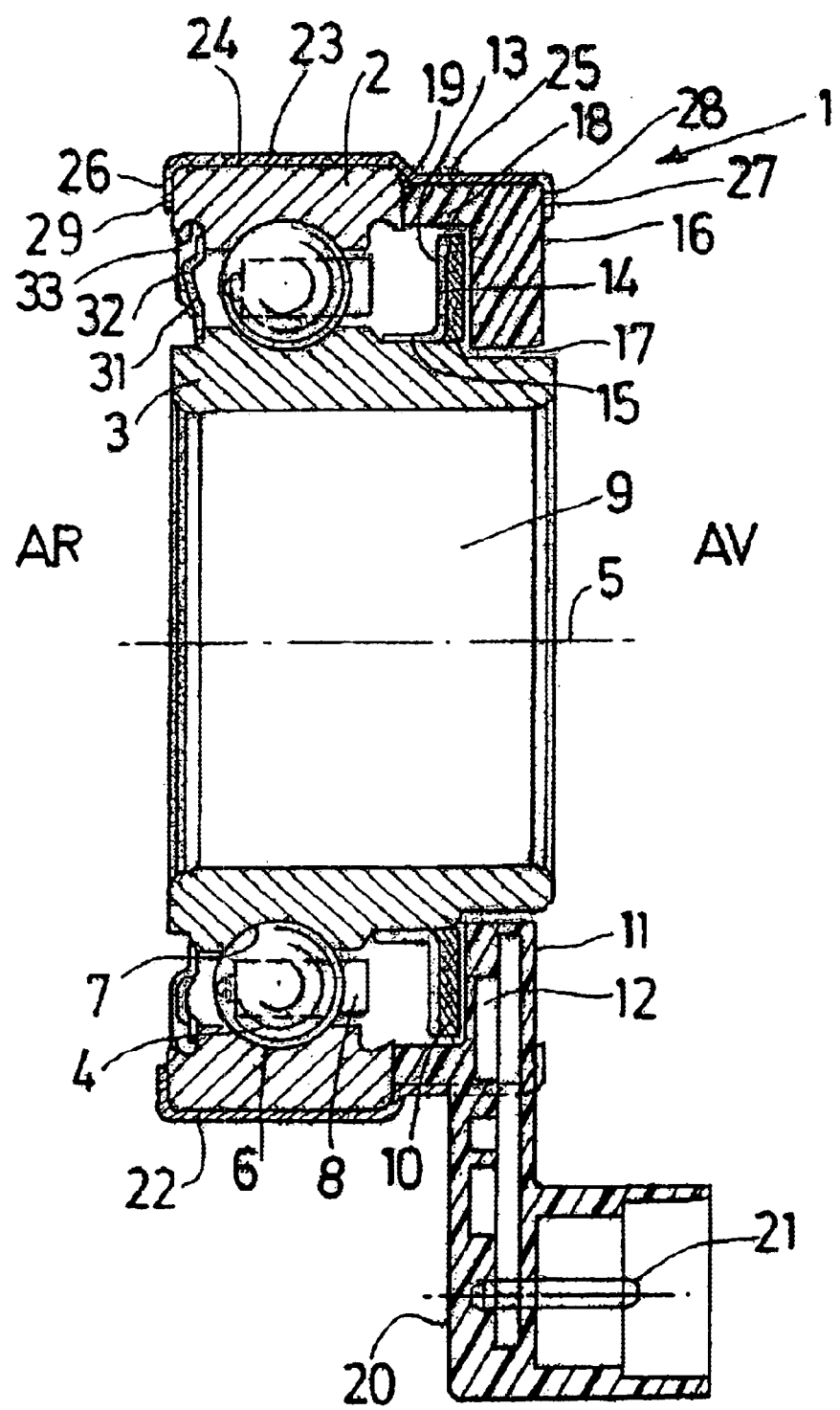
FIG. 2 shows, in longitudinal section, a second variant of a roller bearing according to the invention.

In relation to FIGS. 1 and 2, use of the same information sensor device is described for two different roller bearings 1, namely, a roller bearing 1 (FIG. 2) whose external diameter of the external ring 2 is greater than the other (FIG. 1).

The diameter of casing 22 is chosen to be essentially equal to the external diameter of the external ring 2, so that, after mounting of roller bearing 1 within casing 22, its radial blocking is ensured.

In the first variant depicted in FIG. 1, where the external diameter of ring 16 is essentially equal to that of external ring 2, the sensor 11 is then arranged within casing 22, so as to also ensure radial blocking of sensor 11.

In the second variant depicted in FIG. 2, where the external diameter of ring 16 is less than that of the external ring 2, the casing 22 contains, in addition to a first part 24 to receive the external ring 2, a second part 25 to receive the sensors 11, whose diameter is essentially equal to the external diameter of ring 16.

Thus, when sensor 11 is arranged within casing 22, its radial blocking is also ensured.

Conformation of the second part 25 of casing 22 can be accomplished, for example, by cold deformation, even before or after arrangement of sensor 11 within casing 22.

It is therefore apparent that, for two roller bearings 1 of different size, the same information sensor device can be used in simple fashion without specific modification of roller bearing 1, since no machining of roller bearing 1 is necessary. Radial blocking of roller bearing 1 and sensor 11 is also ensured simply and reliably.

Because the support 23 extends over the entire axial length of the external transversal faces of fixed ring 2 and sensor 11, it is not possible for the external ring 2 or sensor 11 to leave casing 22 radially.

Moreover, slight clamping can be provided at the level of the external surface of support 23, in order to improve rotational immobilization of the external ring 2 and sensor 11.

The casing 22 also contains means of axial holding 26, 27 arranged on both sides of support 23, said means 26, 27 being supported on a part of the front and rear lateral faces 28, 29 of the ring 28 and external ring 29.

This version permits precise positioning of the sensitive elements 12 at a distance from the air gap of encoder 10 by preventing any relative movement of sensor 11 in relation to external ring 2 and therefore in relation to encoder 10.

Moreover, the two means of axial holding 26, 27 being arranged on both sides of support 23 in order to form a mechanical stop, connection of sensor 11 to the external ring 2 is accomplished very reliably.

Figure 3:
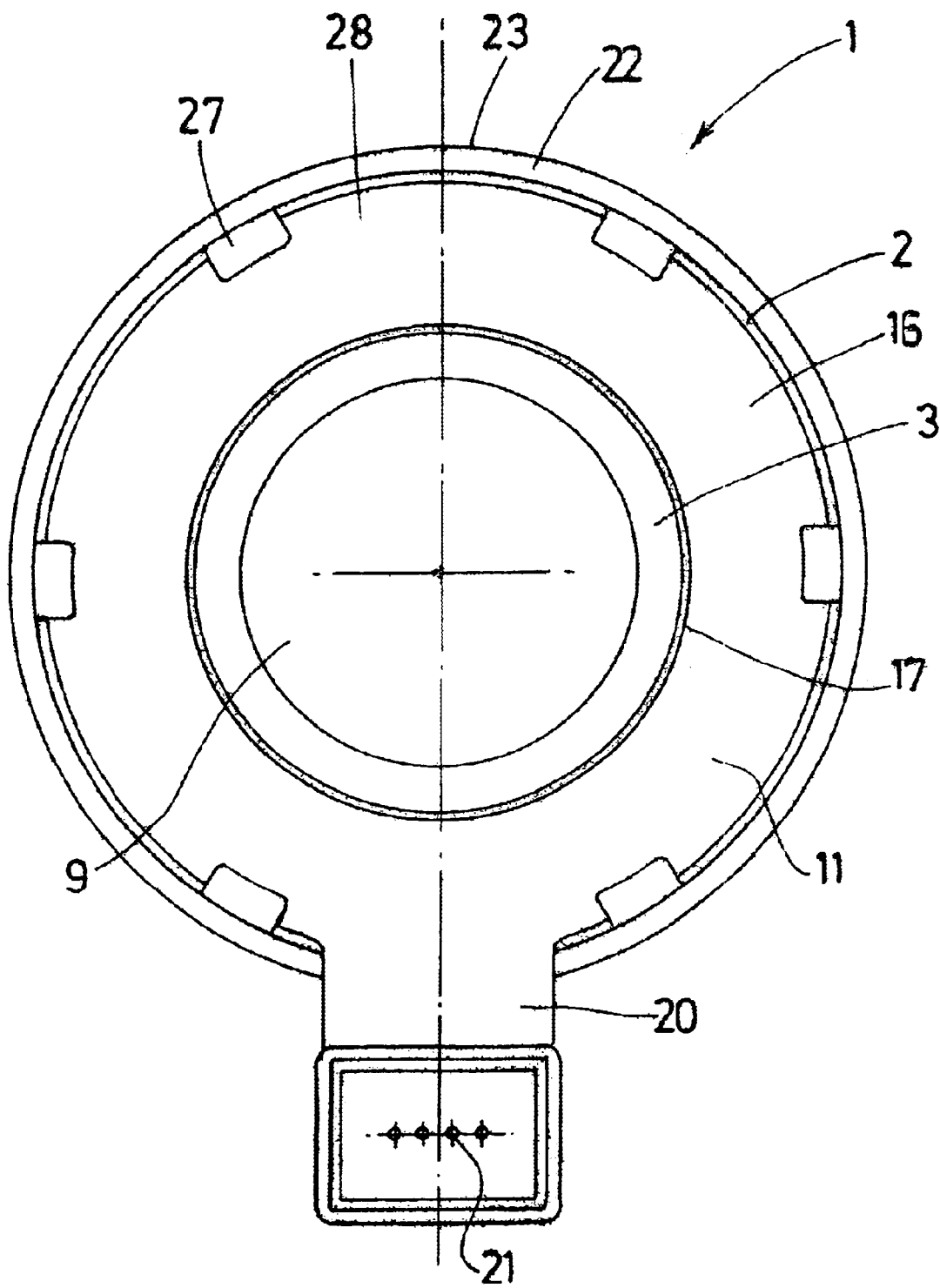
FIG. 3 shows a front view of the roller bearing depicted in FIG. 2.
Figure 5:
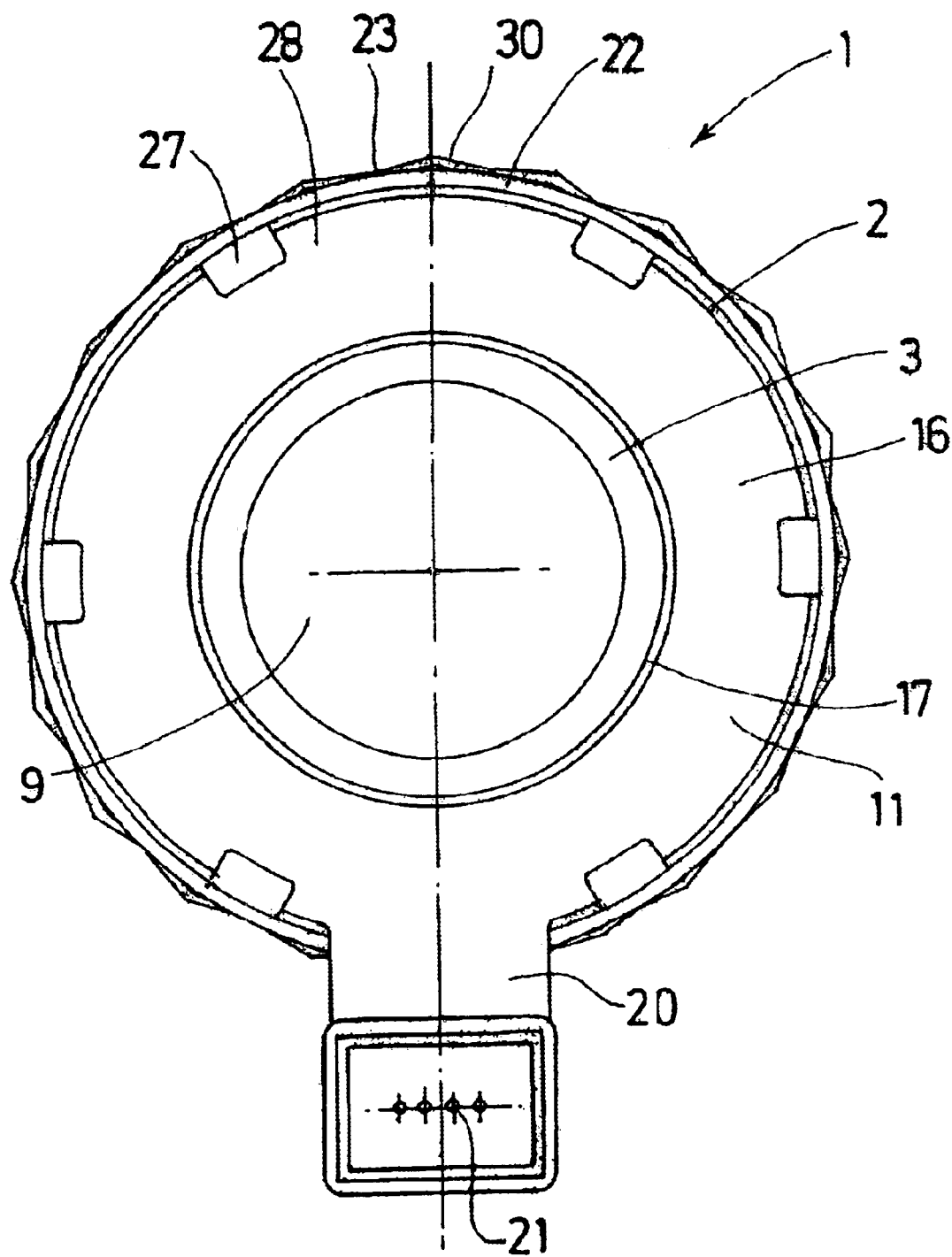
FIG. 5 shows a front view of the roller bearing depicted in FIG. 4.

In the depicted variants, the rear means of holding, i.e., those in contact with the external ring 2, are formed by a radial shoulder 26 and the front means of holding are formed from a number of claws 27 clenched radially on the front face 28 of ring 16, said claws 27 being distributed on the periphery of casing 22 (see FIGS. 3 and 5).

Thus, prior to or after mounting of roller bearing 1 within casing 22, shoulder 26 is formed, for example, by plastic deformation or by machining of an end of the casing 22, whereupon, after arrangement of roller bearing 1 and sensor 11 within casing 22, the claws 27 are clenched, so as to ensure axial blocking of sensor 11 relative to external ring 2.

However, other versions can be contemplated, for example, with identical front and rear means of holding.

Moreover, roller bearing 1 can be intended for mounting in a housing by means of the external face of fixed ring 2. In particular, and when it is used in a steering column, the housing is provided in the steering tube that houses the column.

Owing to the fact that the support 23 extends over the entire axial length of the external transversal face of fixed ring 2, the length of the mounting support of roller bearing 1 in the housing is not reduced by the use of assembly casing 22. In effect, in this case, it is the first part 24 of casing 22 that serves as mounting support.

Figure 4:
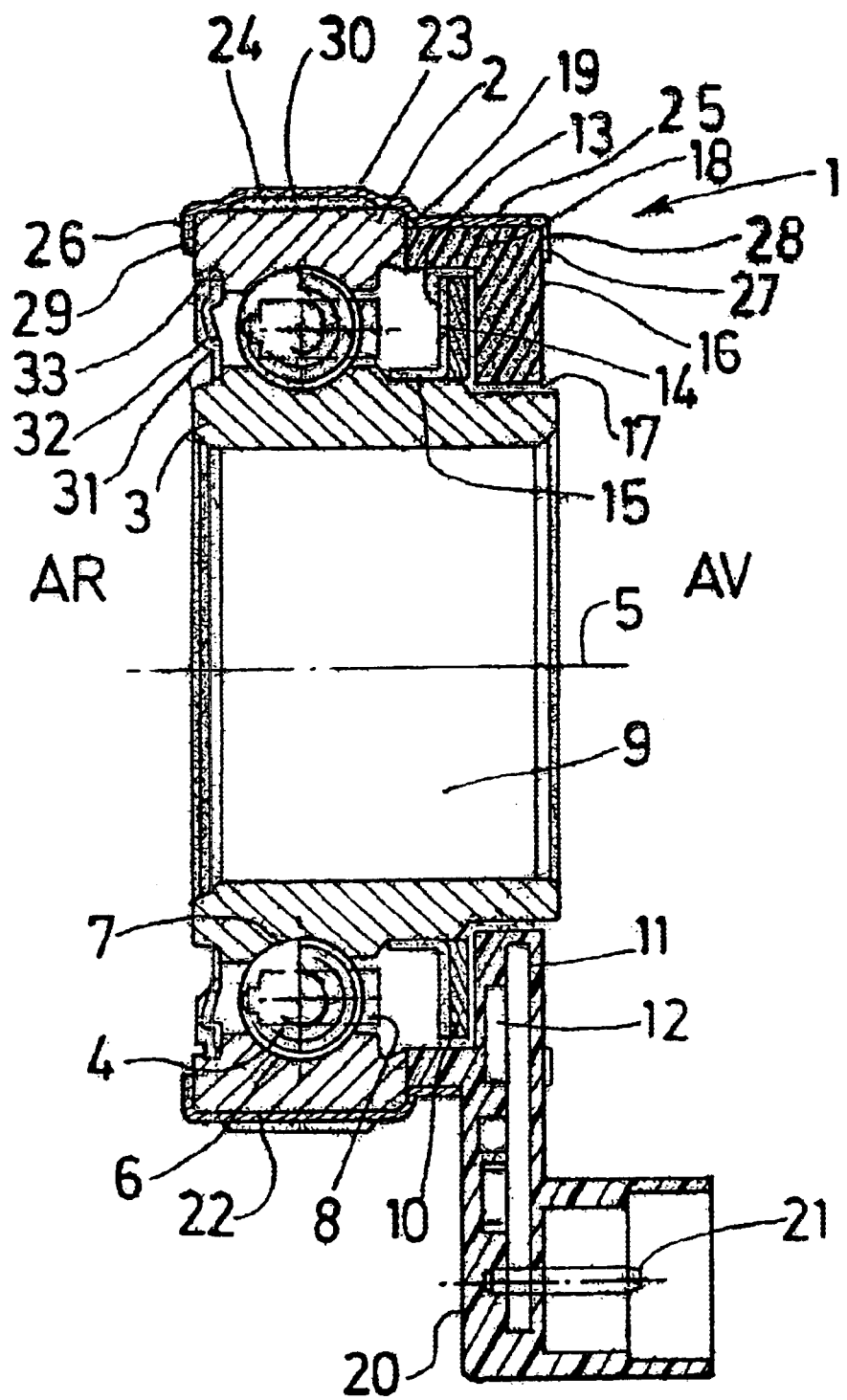
FIG. 4 shows, in longitudinal section, a third variant of a roller bearing according to the invention.

The third variant, shown in FIGS. 4 and 5, prescribes that the first part 24 of casing 22 contain a number of zones 30 that protrude radially.

In particular, the zones 30, made, for example, by plastic deformation, are distributed on the circumference of the first part 24 and have the function of ensuring better clamping force of roller bearing 1 within the housing. The number and shape of these zones 30 are defined as a function of the clamping force to be ensured.

Thus, the presence of zones 30 permits tighter blocking of roller bearing 1 to be obtained within the housing by preventing any inadvertent rotation.

In the variants depicted in the figures, sealing of roller bearing 1 is ensured on the front face by a lip 31 made of elastomer that rubs against the internal ring 3. To do this, lip 31 is molded onto a reinforcement 32 connected, for example, by clipping, in a groove 33 provided on the internal face of external ring 2.

Sealing on the front face is accomplished by the relative arrangement of reinforcement 14 and ring 16. These form an obstacle that avoids pollution of roller bearing 1 and leaks of lubricant. In particular sensor 11 permits protection of encoder 10 by facing it on the assembly from its periphery, in order to limit progression of pollutants.

However, one can provide other means of sealing, for example, the cages 8 can contain axial extensions that rub against rings 2, 3, in order to serve as deflectors or, especially for roller bearings for alternating movements, a solid lubricant can be used, as described in document FR-2 760 055.

Moreover, and to improve sealing on the front side, a sealing lip, as described above, can be used to rub against support 15 of reinforcement 14.

What is claimed is:

1. Roller bearing equipped with an information sensor device, containing a rotating internal ring, a fixed external ring and roller bodies arranged between them, in which said information sensor device contains an encoder of a magnetic pulse generator connected to the rotating ring and a sensor equipped with at least two sensitive elements for detecting magnetic pulses connected to the fixed ring, said roller bearing including an assembly casing of the sensor and the fixed ring, the sensor and fixed ring together defining an external transversal face having a given axial length and opposed lateral faces, said casing containing a cylindrical support that extends over the entire axial length of the external transversal face of the sensor and external ring, and means of axial holding arranged on both sides of said support, said means being supported on at least one part of the opposed lateral faces of the sensor and external ring, the means of holding including a number of claws clenched radially, said claws being provided on at least one end of the support.

2. Roller bearing according to claim 1, wherein the cylindrical support has a first part to receive the external ring and a second part to receive the sensor, the diameter of the first part being greater than or equal to that of the second part.

3. Roller bearing according to claim 1, wherein the means of holding contain a radial shoulder formed on at least one end of the support.

4. Roller bearing according to claim 1, wherein the casing is metal.

5. Roller bearing according to claim 1, wherein the sensor is made in monoblock fashion with sensitive elements arranged facing each other and at an air gap distance from the encoder, and an input/output connector of the sensor is arranged in a radial housing.

6. Roller bearing according to claim 1, wherein the sensitive elements are chosen among Hall-effect sensors, magnetoresistors and giant magnetoresistors.

7. Roller bearing according to claim 1, wherein the encoder is formed form a multipole ring made of synthetic material filled with ferrite particles formed from a number of domains adjacent to the inverted magnetization direction of a given domain relative to the two adjacent domains.

8. Roller bearing equipped with an information sensor device, containing a rotating internal ring, a fixed external ring and roller bodies arranged between them, in which said information sensor device contains an encoder of a magnetic pulse generator connected to the rotating ring and a sensor equipped with at least two sensitive elements for detecting magnetic pulses connected to the fixed ring, said roller bearing including an assembly casing of the sensor and the fixed ring, the sensor and fixed ring together defining an external transversal face having a given axial length and opposed lateral faces, said casting containing a cylindrical support that extends over the entire axial length of the external transversal face of the sensor and external ring, the cylindrical support having a first part to receive the external ring and a second part to receive the sensor, the diameter of the first part being greater than or equal to that of the second part, and means of axial holding arranged on both sides of said support, said means being supported on at least one part of the opposed lateral faces of the sensor and external ring wherein the first part of the casing contains at least one zone that protrudes radially from casing.

* * * * *